United States Patent
Marjamäki et al.

(10) Patent No.: US 7,266,375 B2
(45) Date of Patent: Sep. 4, 2007

(54) BASE STATION CONTROL IN TELECOMMUNICATIONS SYSTEM

(75) Inventors: Jouni Marjamäki, Saunamäki (FI); Marko J. Virtanen, Suutarinkata (FI); Petri Vuorinen, Tuomarilankatu (FI); Esa Bogdanoff, Kiulukatu (FI); Tomi Juurikka, Hatanpaan valtatie (FI); Tarja Muikku, Laadumtie (FI)

(73) Assignee: Nokia Corporation, Espoo (FI)

( * ) Notice: Subject to any disclaimer, the term of this patent is extended or adjusted under 35 U.S.C. 154(b) by 531 days.

(21) Appl. No.: 10/327,896

(22) Filed: Dec. 26, 2002

(65) Prior Publication Data
US 2003/0139141 A1    Jul. 24, 2003

Related U.S. Application Data

(63) Continuation of application No. PCT/FI01/00618, filed on Jun. 28, 2001.

(30) Foreign Application Priority Data
Jun. 30, 2000   (FI)   ................................. 20001566

(51) Int. Cl.
*H04Q 7/20*   (2006.01)
(52) U.S. Cl. .................. 455/446; 455/67.11; 455/424; 455/561
(58) Field of Classification Search ................ 455/446, 455/67.11, 422.1, 560, 423, 424, 561
See application file for complete search history.

(56) References Cited

U.S. PATENT DOCUMENTS

| | | | |
|---|---|---|---|
| 5,761,429 A * | 6/1998 | Thompson | 709/224 |
| 6,408,185 B1 * | 6/2002 | Freeman et al. | 455/446 |
| 6,539,228 B1 * | 3/2003 | Tateson | 455/446 |
| 6,892,073 B2 * | 5/2005 | Fattouch | 455/446 |

FOREIGN PATENT DOCUMENTS

| | | |
|---|---|---|
| DE | 198 13 754 A1 | 9/1999 |
| WO | WO 00/25543 | 5/2000 |

* cited by examiner

*Primary Examiner*—Edan Orgad
(74) *Attorney, Agent, or Firm*—Squire, Sanders & Dempsey L.L.P.

(57) ABSTRACT

A method of controlling base transceiver stations in a telecommunications system and a telecommunications system which comprises one or more base transceiver stations (BTS1, BTS2, BTS3) and an object model representing elements of the telecommunications system, by means of which object model the elements are controlled. The object model comprises a cell object (CELL) which represents one or more base station objects (BTSO1, BTSO2, BTSO3), and the telecommunications system is arranged to control the base station objects, represented by the cell object, via the cell object such that the operation performed on the cell object will be performed simultaneously in all base station objects, represented by the cell object, where said operation can be performed.

22 Claims, 5 Drawing Sheets

BASE STATION CONTROL IN TELECOMMUNICATIONS SYSTEM

This application is a Continuation of International Application PCT/FI01/00618 filed on Jun. 28, 2001, which designated the U.S. and was published under PCT Article 21(2) in English.

BACKGROUND OF THE INVENTION

The invention relates to base station control in a telecommunications system, such as GSM (Global System for Mobile Communication).

Figure 1:
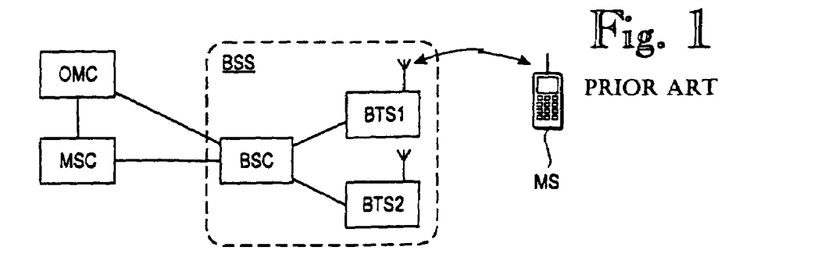
FIG. 1 shows a simplified block diagram of elements in the GSM system that are relevant to the invention.

FIG. 1 shows a simplified block diagram of the GSM system. A mobile station MS is connected over a radio path to a base transceiver station BTS, in FIG. 1 to base station BTS1. The mobile station MS receives transmission of a selected base station. A base station subsystem BSS comprises a base station controller BSC, and base transceiver stations BTS1 and BTS2 subordinated thereto, which base transceiver stations further comprise one or more transceivers TRX which can operate on different frequency ranges. Operation of the whole system is controlled by an operation and maintenance centre OMC. The tasks of the base station controller BSC include, for example, channel monitoring and management, frequency hopping control, base station power control and handover control. In general, a plurality of base station controllers BSC are subordinated to a mobile services switching centre MSC.

With the development of mobile systems, new system versions will be created, such as EDGE (Enhanced Data Rates for GSM Evolution) of the GSM and new frequency ranges will also be introduced, such as EGSM 900 (Extended GSM 900 Frequency Band) of the GSM, and GSM 1800. Base stations can be controlled by means of a network object model, in which each base station is modelled by one or more base station objects. The network object model refers to an object model which represents the elements of the radio network. The network object model can be implemented by means of computer software. Within this application the term base station refers to a physical entity and the term base station object refers to an object representing a base station or a part thereof in a network object model. In other words the term base station object means a representation of a base station or a part thereof for control purposes. The controlling entity, such as a base station controller, sees and handles a base station as one or several base station objects. Different systems and different frequency ranges may overlap in the same geographical area. One base station object can generally comprise only transceivers that are mutually of the same type and/or operate on one frequency range, whereby each frequency range requires a separate base station object, for instance.

Figure 3:
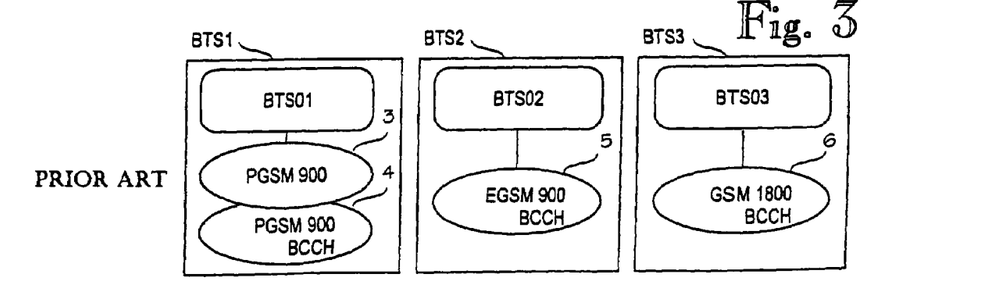
FIG. 3 illustrates an object model for controlling the base stations in accordance with the prior art.

FIG. 3 illustrates a radio network object model for controlling the base transceiver stations BTS1, BTS2 and BTS3. In the figure each base transceiver station BTS1-3 is represented by one base station object BTSO1, BTSO2 and BTSO3. However, one base station BTS can be represented by means of a plurality of base station objects BTSO. The base station BTS1 comprises two transceivers 3 and 4, which operate on the conventional GSM 900 frequency range (PGSM 900, Primary GSM 900), the base station BTS2 comprises one transceiver 5 operating on the EGSM 900 frequency range and the base station BTS3 comprises one transceiver 6 operating on the GSM 1800 frequency range. Each of the base stations BTS1-BTS3 have their own BCCH channel (Broadcast Control Channel) as shown.

In accordance with the prior art, each base station object controlled by the base station controller BSC is controlled separately. This creates a problem that the number of objects to be administered increases when the number of base station objects of different types and/or operating on different frequency ranges increases.

BRIEF DESCRIPTION OF THE INVENTION

The object of the invention is to provide a method and an arrangement implementing the method such that the above-described problems can be solved. The object of the invention is achieved with a method, a base station controller and a telecommunications system, which are characterized by what is set forth in the independent claims 1, 10 and 17. The preferred embodiments of the invention are set forth in the dependent claims.

The invention is based on the idea that an operational cell, i.e. a cell object, is created e.g. in connection with the base station controller or corresponding network element in the network object model of the telecommunications system, which cell object represents one or more base station objects connected to the base station controller such that the operation of the base station objects represented by the cell object can be performed simultaneously via the cell object, at least as concerns performing operations that are common to all base station objects used in the cell.

The method and system of the invention have an advantage that a plurality of different base station objects can be operated flexibly at the same time, and on one hand, the number of objects to be administered on a specific level decreases. On the other hand, the way of operating the base station objects in accordance with the invention does not exclude the possibility of operating the base station objects object-specifically, whereby the same network management system can be used in networks of different types. The invention further enables, for instance, a common BCCH channel (Broadcast control Channel) to be applied to all base station objects represented by the cell object, because they are combined into one operational cell.

BRIEF DESCRIPTION OF THE DRAWINGS

In the following, the invention will be described in greater detail in connection with preferred embodiments with reference to attached drawings wherein.

DETAILED DESCRIPTION OF THE INVENTION

The present invention can be applied to any cellular-type mobile system. Later in the text, the invention will be described in greater detail by way of example, mainly in connection with the GSM system. The invention can also be used in other telecommunications systems, for example in 3rd generation mobile systems, such as Universal Mobile Telecommunications System (UMTS). In the UMTS system a base station controller can be referred to as RNC (Radio Network Controller). The terms referring to the elements of the system may vary in different mobile systems without that it has any importance to the basic idea of the invention. The expressions and terms used should be understood as illustrative, not restrictive. FIG. 1 shows the previously described, simplified structure of the GSM network. As regards a more detailed description of the GSM system, reference is made to the GSM recommendations and to The GSM System for Mobile Communications, M. Mouly & M-B. Pautet, Palaiseau, France, 1992, ISBN:2-9507190-0-7.

In the system of FIG. 1, signalling between the mobile services switching centre MSC and the base station controller BSC is performed, for instance, by means of the CCS7 signalling system (Common Channel Signalling No. 7) and between the base station controller BSC and the base transceiver station BTS by means of the LapD (Link access protocol on D-channel) signalling system, for instance.

Figure 2:
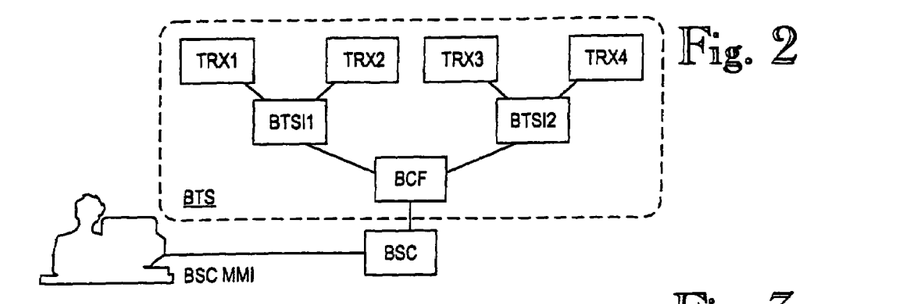
FIG. 2 shows the structure of a base station system in accordance with one embodiment.

FIG. 2 shows the structure of the base station system BSS in greater detail in accordance with one possible embodiment. The figure illustrates the structure of a base station BTS. The base station BTS comprises a base station control function BCF, which controls locally the operation of the BTS and through which the base station is connected to a base station controller BSC. The base station BTS is further divided into base station items BTSI1 and BTSI2. The term base station item refers to a physical part or portion of a base station. Typically, the base station BTS is divided into items BTSI1 and BTSI2 such that one or more transceivers TRX of a given frequency range are related to each item. As mentioned above, there can be one or more of these items in one physical base station. In the figure, transceivers TRX1 and TRX2 are related to base station item BTSI1 and transceivers TRX3 and TRX4 are related to base station item BTSI2. To the base station controller BSC is further connected a local MMI (Man-Machine Interface) terminal BSC MMI, via which the operator can control the base station system, for instance, change the parameters in the base station controller BSC and in the base transceiver station BTS.

Figure 4:
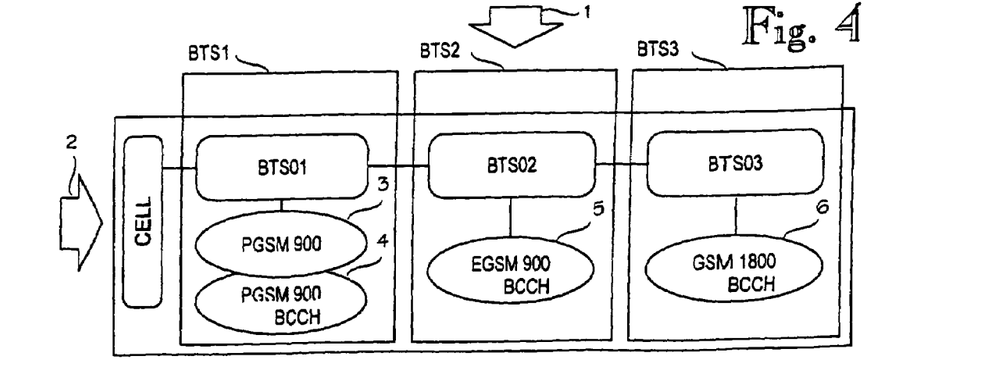
FIG. 4 illustrates an object model for controlling the base stations in accordance with the invention.

FIG. 4 illustrates a radio network object model in accordance with the invention for controlling the base transceiver stations BTS1, BTS2 and BTS3. The radio network object model refers to an object model which represents the elements of the radio network. The radio network object model relates to the network operation and maintenance system by means of which radio network elements can be controlled via an operation and maintenance interface (O&M Interface), for instance locally via the BSC MMI terminal or via the operation and maintenance centre OMC. In general, the operation and maintenance system is implemented by means of computer software. The radio network object model, which represents e.g. base stations BTS subordinated to a given base station controller BSC, is advantageously implemented in the base station controller BSC. The object model can also be implemented in another network element through which the base stations BTS are controlled. In the present example each base transceiver station BTS1-3 is represented by one base station object BTSO1, BTSO2 and BTSO3. However, one base station BTS can be represented by means of a plurality of base station objects BTSO, for instance, in a such a way that each base station item (BTSI1 and BTSI2 in FIG. 2) are represented by a separate base station object BTSO, or, for instance in such a way that the base station items operating on the same frequency range are represented by a common base station object. Other groupings are also possible. The base transceiver station BTS1 comprises two transceivers 3 and 4, which operate on the conventional GSM 900 frequency range (PGSM 900, Primary GSM 900), the base transceiver station BTS2 comprises one transceiver 5 operating on the EGSM 900 frequency range and the base transceiver station BTS3 comprises one transceiver 6 operating on the GSM 1800 frequency range. Base-station-specific (or base-station-object-specific) operation takes place via a base-station-specific operation and maintenance interface 1, whereby each base transceiver station entity is treated as a separate object BTSO1, BTSO2 and BTSO3. In accordance with the invention, a cell object CELL is created in the radio network model, which cell object enables all base transceiver stations BTSO1, BTSO2 and BTSO3 represented thereby to be operated simultaneously via a cell-object-specific interface 2. All base transceiver stations BTS connected to a base station controller BSC or the like, can be subordinated to a common cell object. It is also possible that there are several cell objects. In that case all base stations BTS connected to the same base station controller BSC are not necessarily subordinated to the same cell object. Likewise, if the base station is represented by a plurality of base station objects, all base station objects representing the base station, or just some of them, can be subordinated to a given cell object. The base transceiver stations BTS can further comprise any number of transceivers TRX without that it has any relevance to the basic idea of the invention. The base stations represented by the base station objects subordinate to the same cell object CELL should preferably be co-located and also mutually synchronized, in order that they could efficiently form an operational cell with one another.

It is advantageous that the system creates the cell object CELL such that when the user creates a new base station object in the radio network object model, a new cell object is automatically created to which the base station object is attached. If the user, on creating a base station object, gives an existing cell object identifier, the base station object is attached to the given cell object. Correspondingly, a cell object can be automatically deleted, when the last base station object attached thereto is deleted.

If only one base station object BTSO1, BTSO2 or BTSO3 is attached to the cell object CELL, the base station object can be advantageously controlled in a conventional manner via a base-station-specific operation and maintenance interface 1, and consequently in systems employing only one-base-station cells the system of the invention can be used as such without any changes.

If more than one base station objects BTSO1, BTSO2 or BTSO3 are attached to the cell object CELL, it is advantageous that given operations common to all base station objects can be performed only using the cell object interface 2 by cell-specific commands, and correspondingly, the base-station-object-specific operations can only be performed by base-station-object-specific commands. This can be carried out such that some of the base station parameters are attached to the cell object, whereby these parameters can only be set via the cell object. Thus the cell-specific parameters set via the cell object advantageously comprise such parameters that can be set in common for all base station objects BTSO1, BTSO2 or BTSO3 attached to the cell object. If one parameter attached to the cell object is changed, the system automatically performs a corresponding change in all base station objects attached to the cell object. These parameters may include adjacent cell definitions, trunk table, power control parameters and handover control parameters as well as LAC (Location Area Code), CI (Cell Identity) and BA (BCCH Allocation). Base-station-object-specific parameters, which typically cannot be set via the cell object but which are set base-station-object-specifically, include e.g. frequency hopping definitions and administrative and operational state definitions. However, the division of parameters depends on the system to which the invention is applied and it may differ from what is set forth in the above without that it has any relevance to the basic idea of the invention.

The cell object CELL can be implemented in the radio network object model in various ways: e.g. the cell object can be an object comprising a list of the base station objects representing the base transceiver stations BTS and subordinated to the cell object. The values of parameters attached to and set via the cell object can be attached to a given base station object, defined as the main base station object, belonging to a cell object, or the value data can be found in all base station objects attached to the cell object. The cell object can also be a mere list of objects within the base station object or a separate object which comprises, apart from the list of base station objects belonging to the cell, the values of cell-specific parameters. An unambiguous identifier, such as LAC-CI (LAC, Location Area Code; CI, Cell Identity), can be used as the cell object identifier. Cell-specific parameter values can be set, for instance, by commands which comprise at least the cell object identifier, the parameter identifier and a new parameter value. How this is implemented is not relevant to the basic idea of the invention, which is based on the fact that from the operator's point of view the base station objects subordinated to the cell object can be treated as one object.

In the GSM system, it is determined that one of the base station BTS radio channels, the so-called broadcast control channel, i.e. the BCCH channel, is a unidirectional channel from a base station to subscriber terminals. Within this channel the base station transmits cell-specific data e.g. on power levels to be used and BCCH frequencies of adjacent cells. Synchronization and equalization data, by means of which a mobile subscriber terminal is locked to the system, are also transmitted on the BCCH channel. In the system of the invention, a common BCCH channel can be readily applied to a plurality of base transceiver stations attached to the same cell object and to transceivers of said base transceiver stations possibly operating on different frequency ranges, because the base transceiver stations belong to the same operational cell. For instance in FIG. 4, only transceiver 4 comprises the BCCH channel which is common to all transceivers 3 to 6. The use of a common BCCH channel saves channels for other uses.

So-called background parameters are one group of base station parameters. The background parameters are parameters that are duplicated in a base station such that new parameter values to be updated can be first entered in the base station using secondary memory locations reserved for parameters. After entering all parameters to be modified in the base station, new parameter values can be activated, i.e. the parameters to be used are updated substantially simultaneously by transferring the new values to the primary memory locations of the parameters. During parameter updating, the base station or its item is typically in a blocked state which means that it does not handle traffic. Correspondingly, a base station object representing a blocked base station or a blocked base station item is also in a blocked state. Updating of some background parameters, such as hopping mode parameters, may require that all the base station objects of a given base station be blocked, because they are updated all at once in the entire base station, i.e. for all base station objects related thereto. Updating of some background parameters, such as Base Station Identity Code (BSIC), can in turn require that all the base station objects belonging to a cell object be blocked, because they are updated all at once in all the base station objects of the cell object. It should be noted that the parameters and parameter types described herein are only examples of the parameters, to the updating of which the preferred embodiments described below can be applied. When a cell object according to the invention is used, the base station can be divided into two or more cell objects and the cell object can comprise base station objects of two or more base stations. Then, if some of the parameters require base-station-specific updating and some others cell-object-specific updating, the updating of all parameters is not possible using only base-station-specific updating or only cell-object-specific updating. In that case, parameter updating can be first performed base-station-specifically on some parameters and cell-object-specifically on some others (or vice versa). However, in this manner updating can become unnecessarily complicated, because one or some of the base station objects may have to be blocked on two separate occasions: first, in connection with base-station-specific updating, and then, in connection with cell-object-specific updating. Moreover, updating of some parameters may require that all the parameter updates be introduced simultaneously, i.e. they are effected during one blocking, when it is not necessarily even possible to update the parameters by means of separate base-station-specific and cell-object-specific updates.

FIGS. 5A, 5B, 5C, 5D, 5E, 5F, 6A, 6B, 6C and 6D illustrate a block diagram of a mobile system which comprises four base stations BTS10, BTS20, BTS30 and BTS40 and respective base station control functions BCF-10, BCF-20, BCF-30 and BCF-40. Base station BTS10 is divided into three items which are represented by base station objects BTSO11, BTSO12 and BTSO13, base station BTS20 is also divided into three parts BTSO21, BTSO22 and BTSO23, base station BTS30 is likewise divided into three parts BTSO31, BTSO32 and BTSO33 and base station BTS40 is divided into two parts BTSO41 and BTSO42. Further, the figures shows how the base station objects are grouped into cell objects CELL1, CELL2, CELL3, CELL4, CELL5 and CELL6, whereby cell object CELL1 comprises base station objects BTSO11 and BTSO21, cell object CELL2 comprises base station objects BTSO12 and BTSO22, cell object CELL3 comprises base station objects BTSO13, BTSO23 and BTSO33, cell object CELL4 comprises base station objects BTSO31 and BTSO32, cell object CELL5 comprises base station object BTSO41 and cell object CELL6 comprises base station object BTSO42. In the figures base station objects BTSO in a blocked state are distinguished by bold outlines.

Figure 5A:
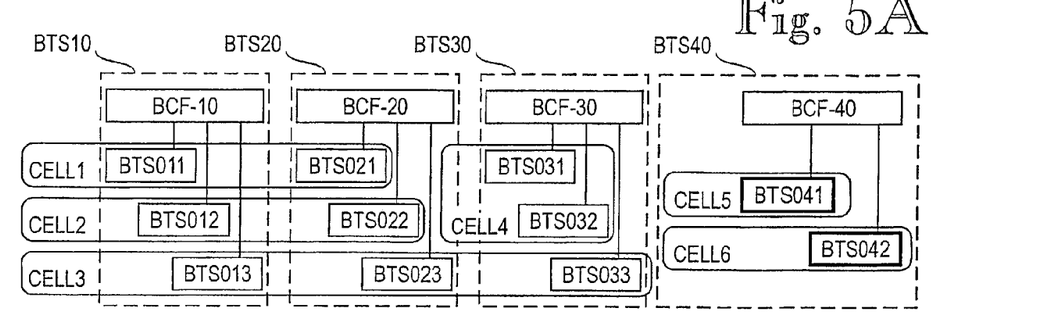
FIG. 5A is a block diagram of a mobile system in accordance with one embodiment of the invention.
Figure 5B:
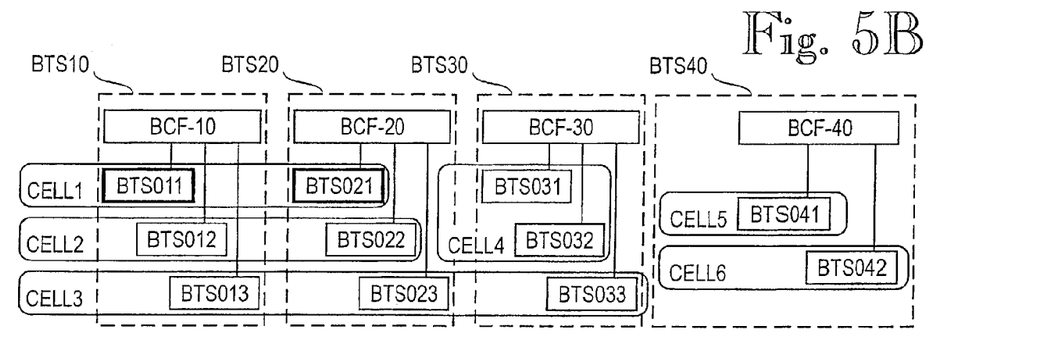
FIGS. 5B, 5C, 5D, 5E and 5F are block diagrams of a mobile system in accordance with one embodiment of the invention.
Figure 5C:
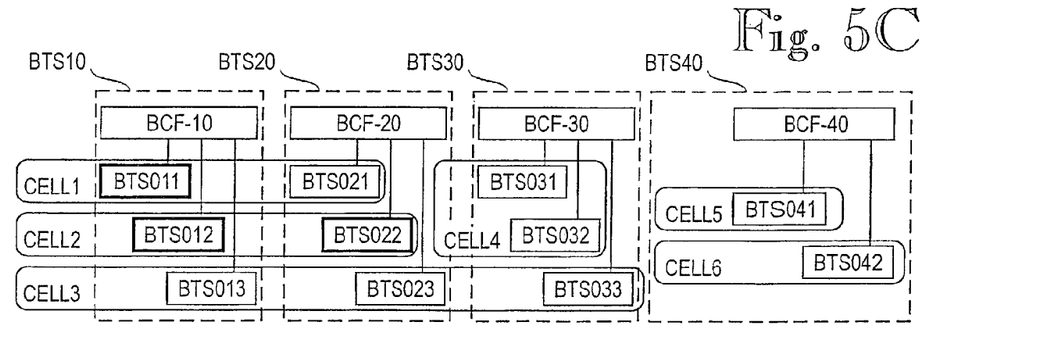
Figure 5D:
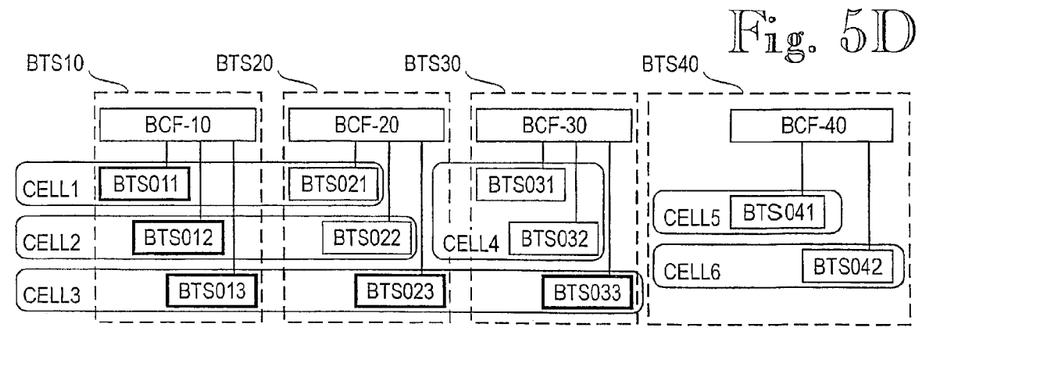
Figure 5E:
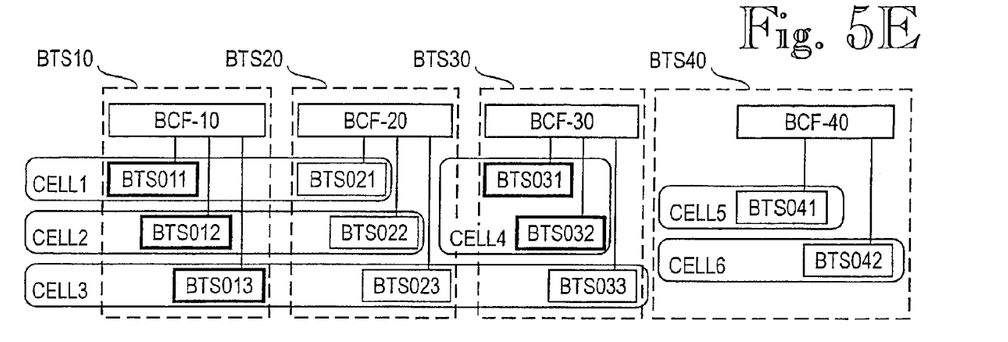
Figure 5F:
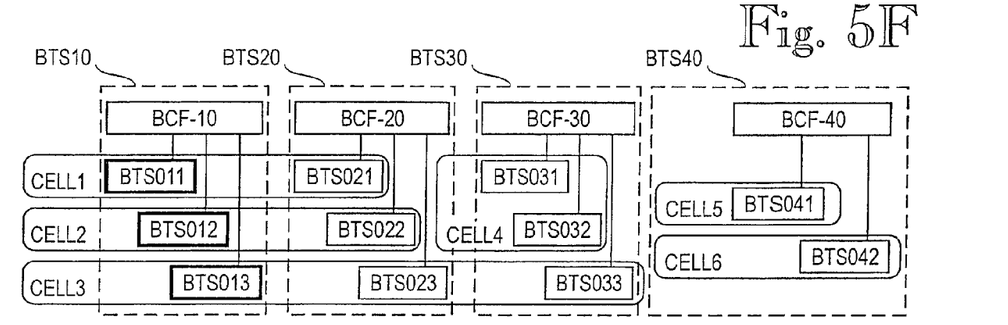
Figure 6A:
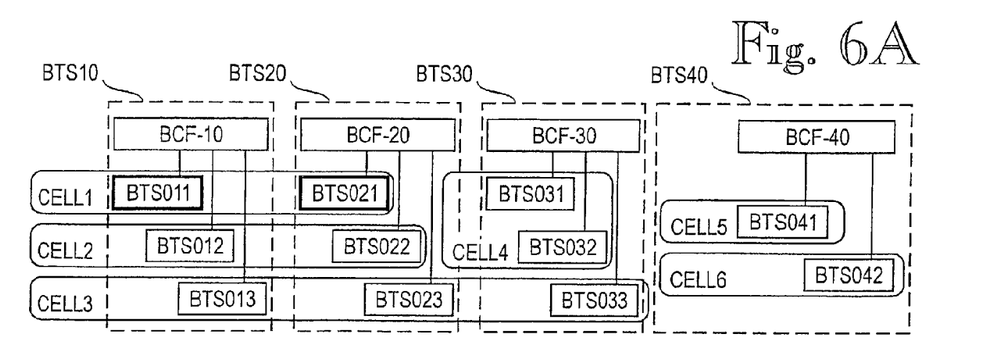
FIGS. 6A, 6B, 6C and 6D are block diagrams of a mobile system in accordance with one embodiment of the invention.
Figure 6B:
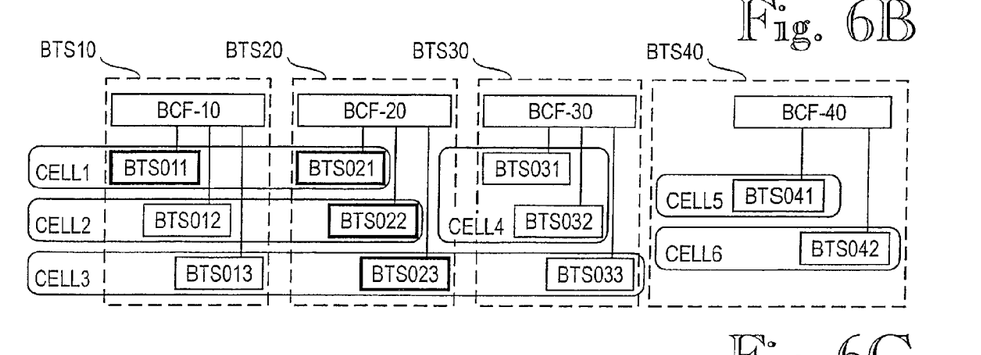
Figure 6C:
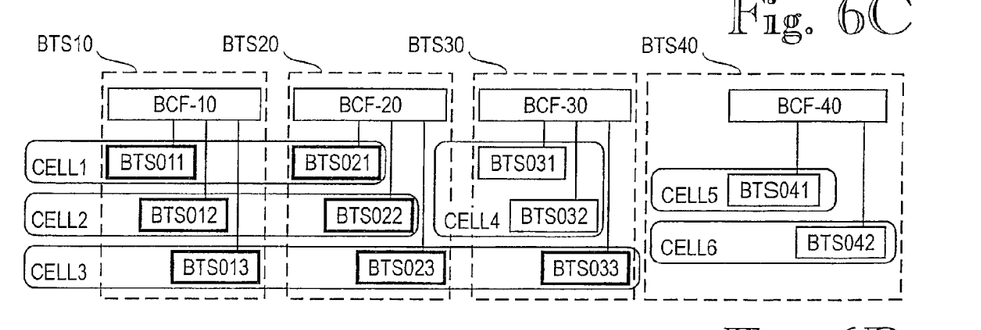
Figure 6D:
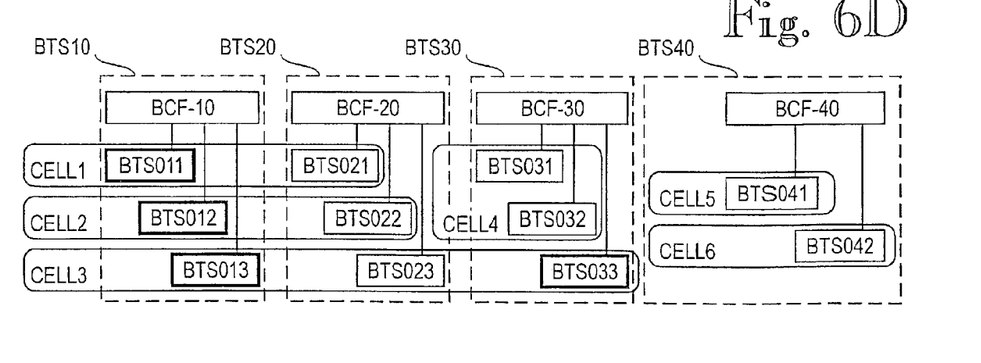

Because base station objects BTSO41 and BTSO42 connected to base station BTS40 belong to cell objects CELL5 and CELL6, which do not comprise base station objects of other base stations, the updating of the parameters of this base station can be performed base-station-specifically, for instance, in the following manner: Base station objects BTSO41 and BTSO42 are set to a blocked state as illustrated in FIG. 5A. Parameters are updated by activating new parameters in the base station objects. If updating requires resetting of the base station, it is performed at this stage. Finally, base station objects BTSO41 and BTSO42 are deblocked, whereby they can start connecting calls.

For a telecommunication system comprising at least one base station BTS10, BTS20 and BTS30 that is divided into at least two separate cell objects CELL1, CELL2, CELL3 and CELL4, and at least one CELL1, CELL2 and CELL3 of these at least two cell objects comprising base station objects of at least two separate base stations, the updating of base station parameters is preferably performed in accordance with a preferred embodiment of the invention. According to a preferred embodiment of the invention the updating of base station object parameters, whose updating requires that all the base station objects of a given base station are blocked, is performed base-station-specifically, i.e. simultaneously in all the base station objects of the base station to which the base station object is related. Similarly according to a preferred embodiment of the invention the updating of base station object parameters, whose updating requires that all the base station objects belonging to the cell object are blocked, is performed cell-object-specifically, i.e. simultaneously in all base station objects of a cell object. Said updatings are performed such that a base station object is blocked when first said parameter is updated and it is kept blocked until all said parameters that require updating are updated.

Figure 7:
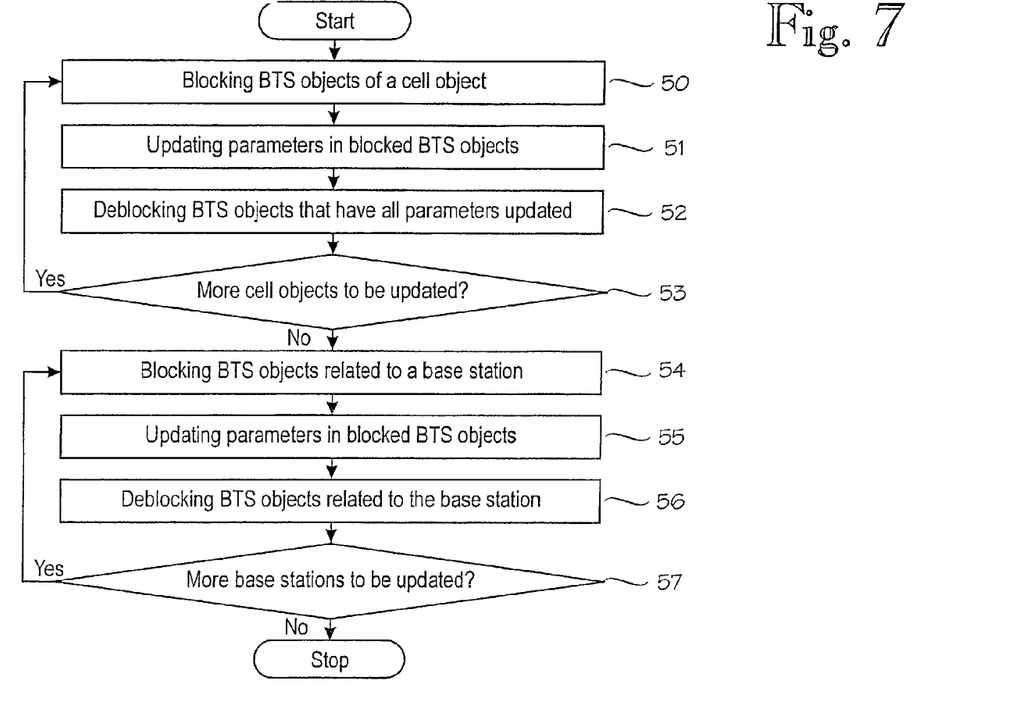
FIG. 7 is a flow chart of base station parameter updating in accordance with one embodiment of the invention.

According to one preferred embodiment of the invention, updating of base stations BTS10, BTS20 and BTS30 can be performed as described below, with reference to the FIGS. 5B, 5C, 5D, 5E and 5F and the flow chart in FIG. 7. First, base station objects comprised by one cell object (BTSO11 and BTSO21 of CELL1 in FIG. 5B) are blocked (step 50). In step 51 parameters in the blocked base station objects which require blocking of all base station objects of the cell object are updated. Also other parameters that can be updated at this stage are updated. Thereafter, those cell objects (BTSO21) that have no further parameters to be updated are deblocked (step 52). Such cell objects (BTSO11) remain blocked that comprise parameters to be updated which require that all base station objects related to a given base station be blocked. In the example illustrated in FIGS. 5B to 5F base station BTS10 represents a base station type that has one or more parameters the updating of which requires the entire base station (i.e. all base station objects related to the base station) be blocked. Next, the above-described procedure (steps 50, 51 and 52) is repeated (step 53) for cell objects CELL2 (BTSO12 and BTSO22 in FIG. 5C), CELL3 (BTSO13, BTSO23 and BTSO33 in FIG. 5D) and CELL4 (BTSO31 and BTSO32 in FIG. 5E). Then, base station objects, which are not yet blocked in previous steps (in steps 50 to 53) and which relates to a base station (BTS10)that still comprise non-updated parameters i.e. at least parameters, whose updating requires that all the base station objects related to the base station be blocked and whose updating is desired, are blocked (step 54) and said non-updated parameters are updated (step 55) in all the base station objects (BTSO11, BTSO12 and BTSO13 in FIG. 5F) of such a base station. In connection with updating, the base station is also reset, if necessary. After updating, the base station objects (BTSO11, BTSO12 and BTSO13) related to the base station (BTS10) are deblocked (step 56). The above-described procedure (steps 54, 55 and 56) are repeated (step 57), if necessary, for different base stations BTS10, BTS20 or BTS30 such that the parameters of all base stations BTS10, BTS20 or BTS30 whose updating requires that the base station objects related to the base station be blocked, will be updated.

Figure 8:
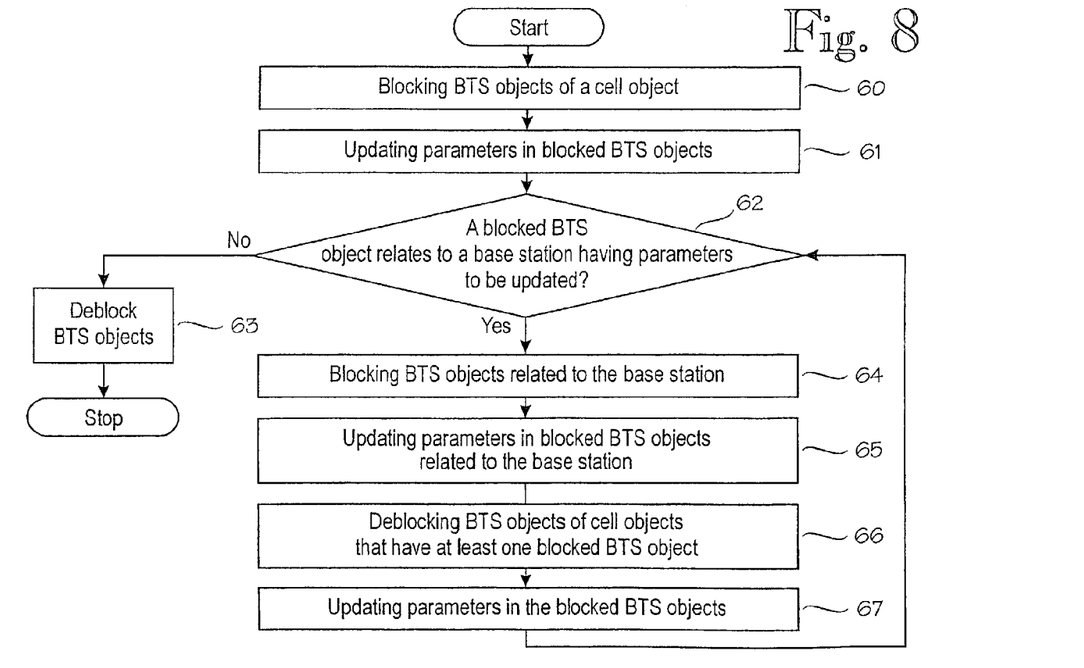
FIG. 8 is a flow chart of base station parameter updating in accordance with one embodiment of the invention.

According to one preferred embodiment of the invention, base stations BTS10, BTS20 and BTS30 can be alternatively updated as described in the following with reference to the FIGS. 6A, 6B, 6C and 6D and the flow chart of FIG. 8. First, base station objects comprised by one cell object (BTSO11 and BTSO21 of CELL1 in FIG. 6A) are blocked (step 60) and in blocked base station objects are updated (step 61) parameters that require blocking of all base station objects of the cell object as well as other possible parameters that can be updated at this stage. Next, it is checked (step 62) whether any of the blocked base station objects relates to a base station comprising parameters whose updating requires that all the base station objects of the base station be blocked and which are to be updated. If not, the blocked base station objects are deblocked (step 63) and updating is stopped. If yes, the base station objects (BTSO22 and BTSO23 in FIG. 6B) related to the base station (BTS20) concerned are blocked (step 64) and the parameters therein, whose updating requires that all the base station objects of the base station be blocked, are updated (step 65). Then are blocked (step 66) the base station objects (BTSO12, BTSO13 and BTSO33 in FIG. 6C) of all the cell objects (CELL2 and CELL3), of which at least one base station object was blocked in a previous step (step 64), i.e. which comprise at least one blocked base station object, and the parameters of these base station objects are updated (step 67), whose updating requires that all the base station objects belonging to the cell object be blocked. In the example illustrated in FIGS. 6A to 6D base station BTS20 represents a base station type that has one or more parameters the updating of which requires the entire base station (i.e. all base station objects related to the base station) be blocked. After updating, the base station (BTS20), whose all base station objects are blocked, is also reset, when necessary and the base station objects (BTSO21, BTSO22 and BTSO23 in FIG. 6D) are deblocked. Thereafter, the above-described step is returned to, where it is checked (step 62) whether any of the blocked base station objects relates to a base station which comprises parameters whose updating requires that all the base station objects of the base station be blocked and which are to be updated and the process proceeds as described above.

It is obvious to a person skilled in the art that, as technology progresses, the basic idea of the invention can be implemented in a variety of ways. The invention and its implementations are not restricted to the above-described examples but they can vary within the scope of the claims.

The invention claimed is:

1. A method comprising:
   controlling base stations in a telecommunications system, the telecommunications system comprising one or more base stations, whereby elements of the telecommunications system are controlled by an object model representing them, in which each base station is represented by one or more base station objects;
   creating in the object model a cell object which represents one or more base station objects; and
   controlling the base station objects represented by the cell object via the cell object such that the operation performed on the cell object will be performed simultaneously in all base station objects, represented by the cell object.

2. The method of claim 1, wherein the base station objects represented by the cell object are under the control of the same base station controller.

3. The method of claim 1, wherein at least one parameter controlling the operation of the base station is attached to the cell object, and
   wherein the controlling of the base station objects represented by the cell object comprises setting, when a parameter value attached to the cell object changes, the corresponding parameter value to be the same in all those base station objects represented by the cell object which comprise said parameter.

4. The method of claim 3, wherein only such base station parameters that are common to all base station objects represented by the cell object are set via the cell object.

5. The method of claim 3, wherein base-station-object-specific setting of parameters attached to the cell object is barred.

6. The method of claim 3, wherein the parameters attached to the cell object comprise one or more parameters from at least one of the following groups: adjacent cell definitions, power control parameters and handover control parameters.

7. The method of claim 3, wherein the telecommunications system comprises at least one base station divided into at least two different cell objects and at least one of said at least two cell objects comprising base station objects of at least two different base stations, whereby base station parameters of a base station object requiring blocking of all base station objects related to one base station are updated base-station-specifically and base station parameters requiring blocking of all base station objects of a cell are updated cell-object-specifically in such a way that the base station object is blocked when first said parameter is updated and is kept blocked until all said parameters requiring updating are updated.

8. The method of claim 7, wherein the updating of base station parameters whose updating requires blocking of all base station objects of a cell comprises
   a) blocking all base station objects of a cell object,
   b) updating said parameters in said blocked base station objects of the cell object and
   c) deblocking base station objects of the cell object except for base station objects that have parameters whose updating requires blocking of all base station objects related to one base station and which need to be updated,
   wherein said steps a, b and c performed cell-object-specifically on each of said at least two cell objects, whereby the updating of base station parameters whose updating requires blocking of all base station objects related to one base station comprises
   d) blocking all unblocked base station objects related to a base station,
   e) updating said parameters in said blocked base station objects related to the base station and
   f) deblocking all base station objects related to the base station,
   wherein said steps d, e and f are performed base-station-specifically on each one of said at least two base stations that have parameters whose updating requires blocking of all base station objects related to the base station and which need to be updated.

9. The method of claim 7, wherein the updating of base station parameters whose updating requires blocking of all base station objects of a cell or blocking of all base station objects related to one base station comprises
   a) blocking all base station objects of a cell object,
   b) updating parameters requiring blocking of all base station objects of a cell in said blocked base station objects of the cell object,
   c) if a blocked base station object relates to a base station that has parameters whose updating requires blocking of all base station objects related to the base station and which need to be updated, blocking all unblocked base station objects related to such a base station and updating said parameters,
   d) blocking all unblocked base station objects of cell objects that have at least one base station object blocked in step c and updating parameters requiring blocking of all base station objects of a cell in said blocked base station objects,
   e) repeating steps c and d for base station objects blocked in step d, and
   f) deblocking base station objects blocked in steps a to d.

10. A Network element comprising:
   an object model representing the base transceiver stations, wherein the network element is configured to control the base transceiver stations and each base station is represented by one or more base station objects,
   wherein the object model comprises a cell object which represents one or more base station objects, whereby the network element is configured to control the base station objects represented by the cell object via the cell object such that the operation performed on the cell object will be performed simultaneously in all base station objects, represented by the cell object, where said operation can be performed.

11. The network element of claim 10, wherein said network element is a base station controller.

12. The network element of claim 10, wherein said network element is a radio network controller.

13. The network element of claim 10, wherein at least one parameter controlling the operation of the base transceiver station is attached to the cell object, whereby the network element, when controlling the base station objects represented by the cell object, is configured to
   set, when a parameter value attached to the cell object changes, the corresponding parameter value to be the same in all those base station objects represented by the cell object which comprise said parameter.

14. The network element of claim 13, wherein the network element is configured to set via the cell object only such base transceiver station parameters that are common to all base station objects represented by the cell object.

15. The network element of claim 13, wherein the network element is configured to bar base-station-object-specific setting of parameters attached to the cell object.

16. The network element of claim 13, wherein the parameters attached to the cell object comprise one or more parameters from at least one of the following groups: adjacent cell definitions, power control parameters and handover control parameters.

17. A telecommunications system comprising:
   one or more base transceiver stations and an object model representing elements in the telecommunications system, by means of which object model the elements are controlled and in which each base station is represented by one or more base station objects,
   wherein the object model comprises a cell object which represents one or more base station objects, whereby the telecommunications system is configured to control the base station objects represented by the cell object via the cell object such that the operation performed on the cell object will be simultaneously performed in all base station objects, represented by the cell object, where said operation can be performed.

18. The telecommunications system of claim 17, wherein at least one parameter controlling the operation of the base transceiver station is attached to the cell object, whereby the telecommunications system, when controlling the base station objects represented by the cell object, is configured to set, when a parameter value attached to the cell object changes, the corresponding parameter value to be the same in all those base station objects represented by the cell object which comprise said parameter.

19. The telecommunications system of claim 18, wherein the telecommunications system is configured to set via the cell object only such base station parameters that are common to all base station objects represented by the cell object.

20. The telecommunications system of claim 18, wherein the telecommunications system is configured to bar base-station-object-specific setting of parameters attached to the cell object.

21. The telecommunications system of claim 18, wherein the parameters attached to the cell object comprise one or more parameters from at least one of the following groups: adjacent cell definitions, power control parameters and handover control parameters.

22. A network element comprising:
controlling means for controlling base stations in a telecommunications system, the telecommunications system comprising one or more base stations, whereby elements of the telecommunications system are controlled by an object model representing them, in which each base station is represented by one or more base station objects;
creating means for creating in the object model a cell object which represents one or more base station objects; and
controlling means for controlling the base station objects represented by the cell object via the cell object such that the operation performed on the cell object will be performed simultaneously in all base station objects, represented by the cell object.

* * * * *